United States Patent [19]

Miyagawa

[11] 4,019,192
[45] Apr. 19, 1977

[54] PHOTOGRAPHIC CAMERA OF THE RETRACTABLE LENS TUBE TYPE WITH A MOVABLE LENS COVER

[75] Inventor: Fumihiro Miyagawa, Yokohama, Japan

[73] Assignee: Ricoh Co., Ltd., Japan

[22] Filed: May 20, 1975

[21] Appl. No.: 579,060

[30] Foreign Application Priority Data

May 20, 1974 Japan .............................. 49-55591
May 20, 1974 Japan ....................... 49-56451[U]

[52] U.S. Cl. .............................. 354/187; 354/191; 354/266
[51] Int. Cl.² ........................................ G03B 17/04
[58] Field of Search .......... 354/154, 187, 190, 191, 354/193, 202, 286, 287, 266, 268

[56] References Cited
UNITED STATES PATENTS 2,865,273  12/1958  Meixner et al. .................. 354/190
3,440,939  4/1969   Peterson et al. .................. 354/187
3,585,916  6/1971   Lange .............................. 354/187
3,616,738  11/1971  Fujita .............................. 354/187

Primary Examiner—L. T. Hix
Assistant Examiner—Alan Mathews
Attorney, Agent, or Firm—McGlew and Tuttle

[57] ABSTRACT

The camera has a bodytube disposed in a retracted position and which is automatically brought to a picture-taking position in conjunction with the movement of a protective cover, covering the front surface of the lens tube or objective lens in the retracted position, to a position in which the protective cover is away from the path of movement of the lens tube to expose the same. In conjunction with the cover movement, the release button, which is hidden inside the camera, is also automatically brought to an operative position. The movable cover can carry a shield for a window for the view finder and/or the exposing light receiving section, if required.

5 Claims, 16 Drawing Figures

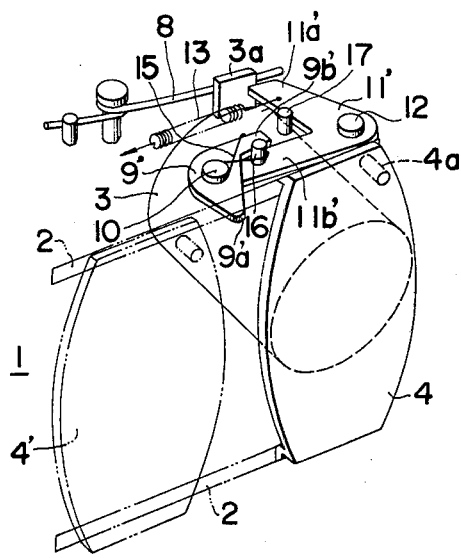
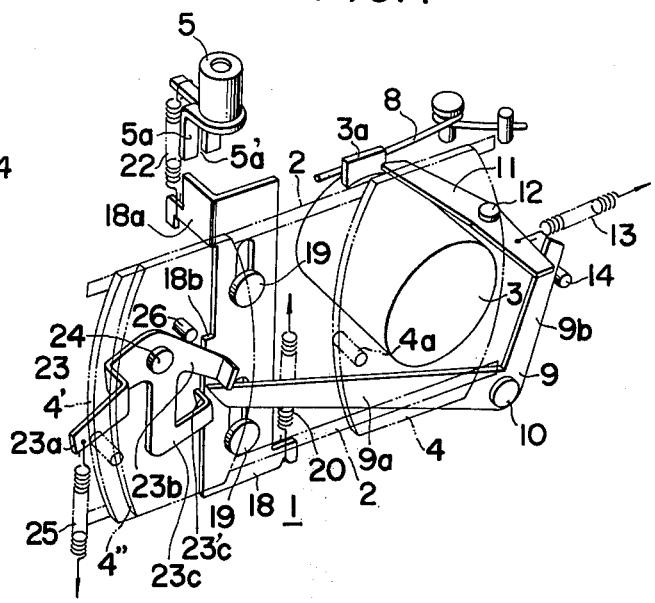
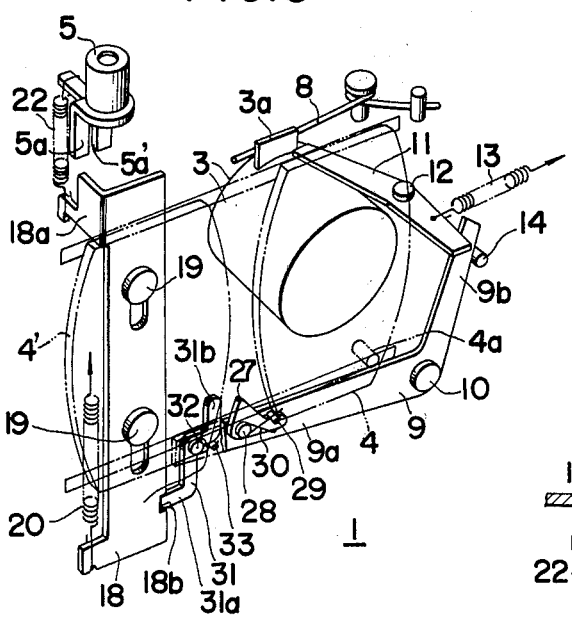
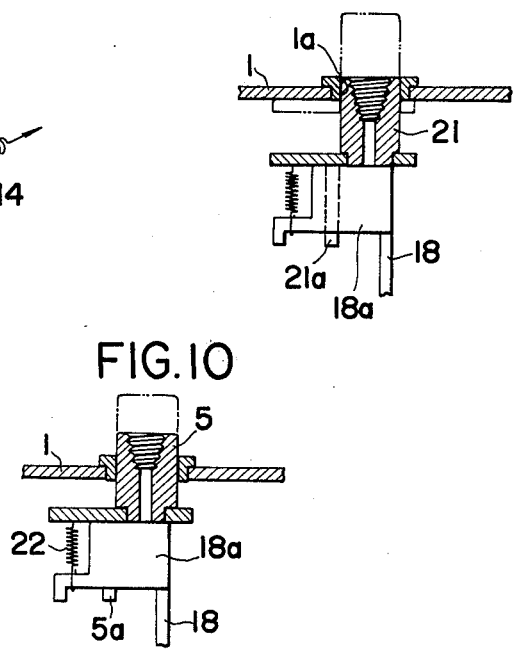

PHOTOGRAPHIC CAMERA OF THE RETRACTABLE LENS TUBE TYPE WITH A MOVABLE LENS COVER

BACKGROUND OF THE INVENTION

This invention relates to photographic cameras in general, and more particularly it is concerned with a photographic camera of the retractable bodytube type in which the bodytube, disposed in a retracted position, is automatically brought to a picture-taking position in conjunction with the movement of a protective cover, covering the front surface of the objective lens tube in the retracted position, to a position in which the protective cover is disposed away from the front surface of the lens tube to expose the same.

In a camera having an objective lens which projects from the main body of the camera, it often happens that the objective lens is soiled or damaged by hitting other objects when the camera is taken from one place to another or put to use. Thus it is desirable that the objective lens be retracted into the main body of the camera and its front surface be covered with a protective cover. However, it is troublesome to manually move or remove the protective cover and then pull out the lens tube to a picture-taking position when the camera is put to use. This is not desirable because the need to perform this troublesome operation may lead to missing an opportunity to release the shutter.

A release button is a protuberance which is relatively small in size. It often happens, however, that the release button is inadvertently pressed when the camera is taken from one place to another, put to use, or the cover of the snapshot case is mounted or removed, with the result that the shutter is released and the film is wasted. In view of this, it is desirable that at least the major portion, if not all, of the release button be hidden inside the main body of the camera when the camera is not in use and that the release button be made to stick out when the camera is put to use. However, the need to perform an operation specifically for causing the release button to stick out of the main body of the camera is preferably eliminated because an opportune moment for releasing the shutter may be missed.

SUMMARY OF THE INVENTION

Accordingly, an object of the present invention is to provide a photographic camera of the retractable objective lens type in which the objective lens is automatically brought from a retracted position to a picture-taking position in conjunction with the movement of protective cover which is movable along a guide path, provided in the camera, from an operative position, in which it provides cover to the objective lens in its retracted position, to an inoperative position, in which it is disposed away from the lens to expose its front surface.

Another object of the invention is to provide a photographic camera of the retractable objective lens tube type in which the objective lens, disposed in its retracted position, is automatically brought to a picture-taking position and, at the same time, the release button, at least the major portion of which is hidden inside the camera, is automatically brought to an operative position, both in conjunction with the movement of the protective cover to its inoperative position.

In one aspect of the invention, there is provided a photographic camera of the retractable objective lens tube type comprising an objective lens tube movable between a retracted position, in which the tube is disposed within the camera, and a picture-taking position, in which the lens tube projects outwardly from the front surface of the camera, the lens tube being urged to move forwardly from its retracted position, means for locking the objective lens lens tube in the retracted position, a protective cover adapted to move along a guide path between an operative position, in which it provides cover to the objective lens disposed in its retracted position, and an inoperative position, in which it is disposed away from the front surface of the objective lens tube to expose the same, and means adapted to be rendered operative in conjuction with the arrival of the protective cover at a position in which it permits the objective lens tube to move to at least the picture-taking position whereby the locking means is released from locking engagement with the objective lens tube to enable the same to stick out to the picture-taking position.

In another aspect of the invention, there is provided a photographic camera of the retractable objective lens type comprising an objective lens tube movable between a retracted position, in which the lens tube is disposed within the camera, and a picture-taking position, in which the lens tube projects outwardly of the camera from the front surface thereof, the lens tube being urged to move forwardly from its retracted position, means for locking the objective lens tube in the retracted position, a protective cover adapted to move along a guide path between an operative position, in which it provides cover to the objective lens tube disposed in its retracted position, and an inoperative position, in which it is disposed away from the front surface of the objective lens tube to expose the same, a release button adapted to appear on the upper surface of the camera and disappear therefrom, a release lever movable at least between an operative position, in which the release button appears on the surface of the camera, and an inoperative position, in which the release button is withdrawn into the camera a predetermined amount, the release button being urged into engagement with the release lever and the release lever being urged to return to its operative position, and means adapted to lock the release lever in its inoperative position, the last mentioned means being rendered operative in conjunction with the arrival of the protective cover at a position in which it permits the objective lens tube to move to at least the picture-taking position whereby the release lever is unlocked to permit the release button to move to its operative position and at the same time the locking means is released from locking engagement with the objective lens tube to enable the same to stick out to the picture-taking position.

Additional and other objects and features of the invention will become evident from the description set forth hereinafter when considered in conjunction with the accompanying drawings.

BRIEF EXPLANATION OF THE DRAWINGS

FIG. 6 is a perspective view of the essential portions of a second embodiment of the invention;

FIG. 7 is a perspective view of the essential portions of a third embodiment of the invention;

FIG. 8 is vertical sectional view of the release button portion of the embodiment of FIG. 7;

FIG. 9 is a perspective view of the essential portions of a fourth embodiment of the invention;

FIG. 10 is a vertical sectional view of the release button portion of the embodiment of FIG. 9;

DETAILED DESCRIPTION OF THE PREFERRED EMBODIMENTS

Figure 1:
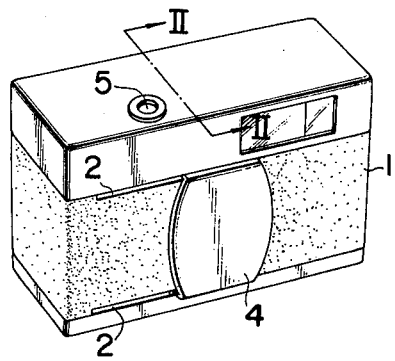
FIG. 1 is a perspective view of a camera incorporating the present invention therein, the camera being in a position in which its objective lens is in a retracted position.
Figure 2:
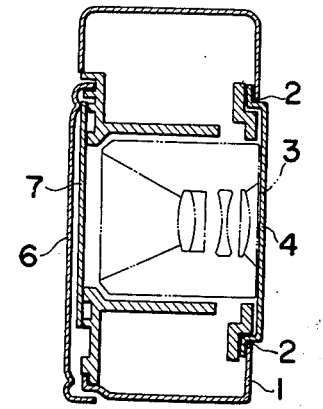
FIG. 2 is a sectional view taken along the line II—II of FIG. 1.
Figure 3:
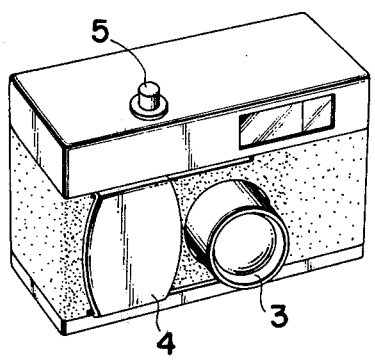
FIG. 3 is a perspective view of the camera of FIG. 1 shown in a condition in which it is ready for picture taking.

Embodiments of the invention will now be described with reference to the accompanying drawings. FIG. 1 and FIG. 3 are perspective views of a photographic camera of the retractable objective lens type incorporating the invention therein, and FIG. 2 is a sectional view taken along the line II—II of FIG. 1. A protective cover 4 is provided in the camera body 1 and adapted to move along a guide path defined between two guides, 2, 2 disposed horizontally and parallel to each other in spaced relationship on the front surface of the camera body 1, the protective cover 4 being movable between an operative position in which it provides cover to the front surface of an objective lens tube 3 disposed in a retracted position as shown in FIG. 1, and an inoperative position in which it is disposed away from the front surface of the objective lens tube 3 so as to permit the objective lens to automatically stick out to the picture-taking position.

There is also provided a shutter release button 5 at least the major portion of which can be withdrawn into the camera body 1 as shown in FIG. 1 when the camera is not in use, and which can be made to stick out to an operative position as shown in FIG. 3 in conjunction with the movement of the protective cover 4 to its inoperative position. In FIG. 2, 6 designates a rear cover hingedly connected to the rear surface of the camera body 1, and 7 a pressing plate urged to press against the camera body 1 by a spring (not shown) mounted between the plate 7 and rear cover 6.

Figure 4:
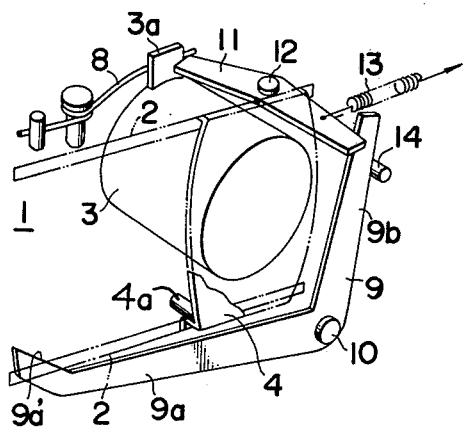
FIG. 4 and FIG. 5 are perspective views of the essential portions of a first embodiment of the invention.
Figure 5:
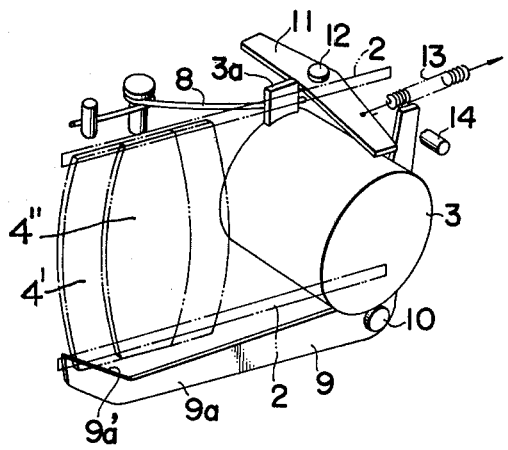

FIG. 4 and FIG. 5 show one embodiment of the automatic objective lens projecting mechanism. The lens bodytube 3, movable between its retracted position in FIG. 4 and its picture-taking position shown in FIG. 5, is formed at its rear end with a projection 3a and mounted in the camera body 1 for sliding movement in the direction of the optical axis. A spring 8 normally biases lens tube 3 to move to its picture-taking position. The protective cover 4, movable between its operative position (see FIG. 4) and its inoperative position (see FIG. 5) along a guide path defined between the two guides, 2, 2 as aforesaid, is provided with an inwardly directed pin 4a attached thereto. 9 is a substantially L-shaped coupling lever consisting of an arm 9a, including an upwardly facing inclined surface 9a' disposed at its forward end, and another arm 9b, and pivotally mounted on a pin 10 connected to the camera body 1. When the protective cover 4 moves to its inoperative position, the inwardly directed pin 4a moves in sliding movement on the inclined surface 9a' so that the lever 9 swings counterclockwise. 11 is a locking lever pivotally mounted on a pin 12 connected to the camera body 1 and normally biased to move counterclockwise by a spring 13 connected thereto. The locking lever 11 has one end which is adapted to be brought into and out of engagement with the projection 3a on the lens bodytube 3. When the locking lever 11 locks the lens tube 3 in its retracted position as shown in FIG. 4 against the biasing force of the spring 8, the locking lever 11 presses at the other end thereof the arm 9b of the coupling lever 9 against a stopper 14 so as to thereby maintain the coupling lever 9 in its rightmost position.

The first embodiment is constructed as aforementioned. If the protective cover 4 moves along its guide path from its operative position shown in FIG. 4 to a first inoperative position shown at 4' in FIG. 5, the front surface of the objective lens 3 is fully exposed and at the same time the pin 4a moves in sliding movement on the inclined surface 9a' of the coupling lever 9, so that the coupling lever 9 is caused to swing counterclockwise. The result of this is that the arm 9b causes the locking lever 11 to swing clockwise against the biasing force of spring 13 and to bring the same out of engagement with the projection 3a. Thus the lens bodytube 3 is free to be moved by spring 8 to stick forwardly out of the front surface of the camera body 1 a predetermined distance and stops at the picture-taking position where it is maintained by stopper means (not shown) to be ready for shooting. On the other hand, the protective cover 4 moves slightly backwardly along the inclined surface 9a' toward the lens bodytube 3, as when the hand is removed therefrom, till it arrives at a second inoperative position 4" where it remains stationary.

In moving the lens tube 3 to its retracted position, pressure is applied to the front surface of the lens tube 3 to push the same into the camera body 1 against the biasing force of spring 8. Upon the lens tube 3 reaching its retracted position, the locking lever 11 swings clockwise into engagement with the projection 3a to keep the lens tube 3 in its retracted position. Thus the protective cover 4 can be moved to its operative position.

FIG. 6 shows a second embodiment in which the projection 4a is disposed on the protective cover 4 in a position which is diagonally opposite to the position in which it is disposed in the first embodiment, and the locking lever 11' is an L-shaped lever and consists of arms 11a' and 11b', the lever 11' being urged by spring 13 so that arm 11a' is maintained in engagement with the projection 3a to lock the lens tube 3 in its retracted position. The coupling lever 9' consists of arms 9a' and 9b' and is pivotally connected through pin 10 to an end portion of arm 11b'. A spring 15 is connected to the lever 9' to normally urge the same to move clockwise, so that arm 9b' is in engagement with a pin 16 attached to arm 11b'. Arm 9a' is disposed in the path of movement of the protective cover 4. 17 is a stopper attached to the camera body 1.

If the protective cover 4 is moved from its operative position shown in solid lines to its inoperative position 4' shown in dash-and-dot lines in FIG. 6, then the front surface of the objective lens 3 is exposed. The pin 4a of the protective cover 4 is brought into engagement with arm 9a' of the coupling lever 9' while the protective cover 4 is moving. This results in the locking lever 11' swinging clockwise against the biasing force of spring 13, so that arm 11a' is released from engagement with the projection 3a. This permits the lens tube 3 to be moved by spring 8 to its picture-taking position.

Upon the protective cover 4 reaching the inoperative position 4', the pin 4a is released from engagement with arm 9a'. This enables the locking lever 11' to swing counterclockwise into engagement with the stopper 17 to be ready for locking the lens tube 3 in its retracted position. Therefore, by pushing the lens tube 3 into its retracted position, it is possible to bring the locking lever 11' into engagement with the projection 3a to lock the lens tube 3 in its retracted position while arm 9a' of the coupling lever 9 projects into the path of movement of the protective cover 4. When the protective cover is moved from its inoperative position to its operative position, the pin 4a is brought into engagement with arm 9a' again. However, the locking lever 11' remains stationary, although the coupling lever 9' merely swings counterclockwise against the biasing force of spring 15.

FIG. 7 and FIG. 8 show an embodiment in which the lens tube 3 moves from its retracted position to its picture-taking position and at the same time the shutter release button moves from its inoperative position, in which it is disposed within the camera body 1, to its operative position, in which it sticks out of the camera body 1, as the protective cover 4 is moved from its operative position to its inoperative position. In the figures, the guides 2, 2, lens tube 3, spring 8, locking lever 11 and spring 13 are similar to those shown and described in the first embodiment. The protective cover 4 has the pin 4a attached thereto, but arm 9a of the coupling lever 9 has no inclined surface, unlike arm 9a of the first embodiment.

18 is a release lever including a bent portion 18a and an offset portion 18b and supported for vertical sliding motion by two pins 19, 19 connected to the camera body 1. The release lever 18 is urged by a spring 20 to move upwardly to an upper position. When the release lever 18 is moved downwardly a predetermined distance from its upper position, it is possible to release the shutter. The release button 5 is slidably mounted in an opening 1a formed in the camera body 1 and includes a leg 5a formed with a slit 5a' which loosely receives therein the bent portion 18a of the release lever 18 for sliding motion. A spring 22 is mounted between the release lever 18 and the release button 5 so that the release button 5 is maintained in engagement with the upper end of the release lever 18 at all times (see FIG. 8).

23 is a triple-arm lever consisting of three arms 23a, 23b and 23c and pivotally supported by a shaft 24 connected to the camera body 1. The triple-arm lever 23 is urged to move counterclockwise by a spring 25 and is normally in engagement with a stopper 26 to be maintained in a normal position. When the triple-arm lever 23 is in its normal position, a bent portion 23c' at the forward end of arm 23c is capable of engaging the offset portion 18b of the release lever 18. A bent portion 23b' of arm 23b is maintained in engagement at all times with arm 9a of the coupling lever 9, while arm 23a is adapted to be brought into engagement with the protective cover 4 and to swing clockwise when the latter is brought to the first inoperative position 4'. The protective cover 4 is returned from its first inoperative position 4' to its second inoperative position 4'' by a spring (not shown) connected to the camera body 1.

In operation, if the release button 5 is pressed and moved from its operative position shown in dash-and-dot lines in FIG. 8 to its inoperative position in which it is hidden in the camera body while the lens tube 3 is in its retracted position and the protective cover 4 is in its operative position, then arm 23c of the triple-arm lever 23 is brought into engagement with the offset portion 18b of the release lever 18 and locks the lever 18 against the biasing force of spring 20. Thus the release button 5 is maintained in its inoperative position as shown in FIG. 1 and FIG. 8.

Upon the protective cover 4 being moved from its operative position to its first inoperative position 4', the pin 4a is brought into engagement with arm 23a and causes the triple-arm lever 23 to swing clockwise. As a result, arm 23c is released from engagement with the offset portion 18b and permits the release lever 18 to be moved to its upper position by the biasing force of spring 20. The release button 5 is brought to the operative position shown in dash-and-dot lines in FIG. 8. At the same time, arm 23b of the triple-arm lever 23 causes the coupling lever 9 to swing counterclockwise, so that the locking lever 11 swings clockwise and permits the lens tube 3 to be moved to its picture-taking position by the biasing force of spring 8. Thus the camera is ready for shooting. The protective cover 4 remains stationary after being returned slightly to its second inoperative position 4''. Thus the locking lever 11 is ready to lock the lens tube 3 and the three-arm lever 23 is ready to lock the release lever 18, and hence release button 5, any time as desired.

FIG. 9 and FIG. 10 show a fourth embodiment in which the lens bodytube 3, protective cover 4, release button 5, spring 8 and locking lever 11 are similar to those shown and described in the preceding embodiment. 27 is a projecting member pivotally supported by a pin 28 connected to arm 9a of the coupling lever 9. A spring 30 is mounted between the projecting member 27 and a pin 29 attached to arm 9a so that the projecting member 27 is urged at all times to swing clockwise by the biasing force of spring 30 into engagement with pin 29, the projecting member 27 projecting into the path of movement of pin 4a of the protective cover 4. 31 is a claw lever comprising a claw 31a and an arm 31b and pivotally supported by a pin 32 connected to a forward end portion of arm 9a of the coupling lever 9. A spring 34 is mounted between the claw lever 31 and a pin 33 attached to arm 9a and urges the claw lever 31 to swing clockwise. The claw lever 31 is adapted to be brought into engagement with pin 33 and its clockwise swinging movement is prevented thereby when the claw 31a thereof is received in a cutout 18b formed in the release lever 18 as subsequently to be described. When the protective cover 4 moves to its inoperative position, arm 31b is pushed by pin 4a. The release lever 18 is substantially similar to the corresponding part 18 of the third embodiment except for the fact that the offset portion 18b is replaced by the cutout 18b. The release button 5 is similar to the corresponding part of the third embodiment.

In operation, if the release button is pressed and moved to its inoperative position shown in solid lines in FIG. 10, then the claw 31a of the claw lever 31 is engaged in the cutout 18b formed in the release lever 18 and the release lever 18 is locked in position as shown in FIG. 9. Thus the release lever 18 is kept from moving vertically and hence the release button 5 is maintained in its inoperative position (see FIG. 10).

Upon the protective cover 4 being moved along its path of movement to its inoperative position 4', pin 4a pushes the projecting member 27 and causes the coupling lever 9 to swing counterclockwise after the front surface of the lens tube 3 is exposed. This results in the locking lever 11 swinging clockwise and being released from engagement with the projection 3a, thereby permitting the lens tube 3 to be moved to the picture-taking position by spring 8. At the same time, pin 4a causes the claw lever 31 to swing counterclockwise against the biasing force of spring 34 and the claw lever 31 is held by the protective cover 4 disposed in its inoperative position, so that the claw 31a is released from engagement in the cutout 18b. This permits the release lever 18 to be moved to its upper position by spring 20. Thus the release button 5 is moved upwardly to its operative position shown in dash-and-dot lines in FIG. 10, so that the camera is ready for shooting.

If the protective cover 4 is moved to its operative position after the lens tube 3 is moved to its retracted position, then the claw 31a of claw lever 31 is capable of engagement in the cutout 18b. Thus, if the release lever 18 is moved downwardly by pressing the release button 5, then the release lever 18 is locked by the claw lever 31 when the release button 5 is disposed in the inoperative position.

If the third or fourth embodiment is incorporated in a camera of the type in which the shutter is of the set type, it is possible to bring the release button 5 to its inoperative position in which it is bodily withdrawn into the camera body 1 as shown in FIG. 8 after the shutter is released and the film is exposed. If it is desired to bring the release button to its inoperative position after the shutter is set, one has only to use the mechanism shown in FIG. 9, so that the release lever 18 will be locked before the shutter is released. In this case, the release button 5 preferably extends slightly from the camera body 1 as shown in FIG. 10 when it is in its inoperative position. This is also true of cameras equipped with a shutter of the ever set type. In incorporating the present invention in cameras having an electrically operated shutter, one has only to cut off the power source for the shutter, by the protective cover, when the latter has moved to its inoperative position.

Figure 11:
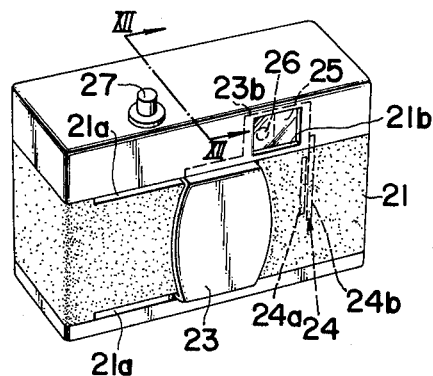
FIG. 11 is a perspective view of a fifth embodiment of the invention.
Figure 13:
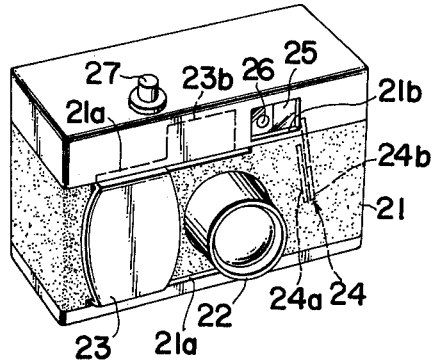
FIG. 13 is also a perspective view of the fifth embodiment of the invention.
Figure 12:
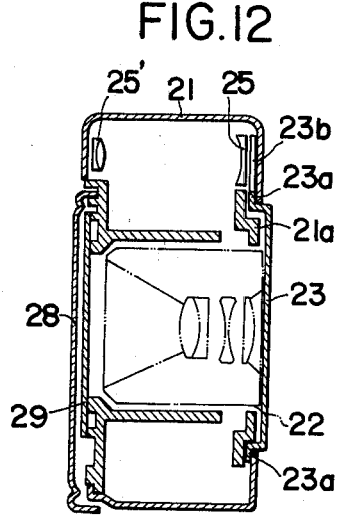
FIG. 12 is a sectional view taken along the line XII—XII of FIG. 11.

FIG. 11 to FIG. 13 show a fifth embodiment in which 21 designates a body of the photographic camera comprising a guide path, defined between two profile members 21a, 21a disposed parallel to each other in spaced relationship on the front surface of the main body 21, and an opening 21b serving as a window for the viewfinder and the exposing light receiving section. 22 designates a lens tube mounted in the camera body 21 and adapted to move between a dash-and-dot line retracted position, shown in FIG. 12, and a picture-taking position, shown in FIG. 13, in which it projects from the camera body 21. 23 designates a protective cover having profile legs 23a, 23a loosely fitted in the respective L-shaped members 21a, 21a of the guide path and adapted to move between an operative position, in which it covers the front surface of the lens tube 22 in the retracted position as shown in FIG. 11 and FIG. 12, and an inoperative position, in which it permits the lens tube 22 to move to the picture-taking projecting position as shown in FIG. 13. The protective cover 23 is formed therein with a shield 23b which is disposed such that it closes the opening 21b in the main body 21 when the protective cover 23 is in the operative position and cleans the opening 21b when the protective cover 23 is in the inoperative position.

24 designates a switch, for the power source of the exposure meter, which consists of a fixed contact 24a and a movable contact 24b, the movable contact 24b being actuated by the shield 23b when the protective cover 23 moves to the operative position, to open the switch 24 and being released when the protective cover 23 moves to the inoperative position, to close the switch 24. 25 is a finder objective lens, 25'a a finder eyepiece, 26 an exposure meter light receiving section, 27 a release button, 28 a rear cover and 29 a pressing plate.

When the protective cover 23 is in the operative position shown in FIG. 11, it covers the front surface of the lens tube 22, so that soiling of, and adhesion of dust to, the lens can be avoided and damage thereto can be prevented. At the same time, the shield 23b forming a part of the protective cover 23 closes the opening 21b and cuts off light incident on the finder objective lens 25, so that the field of view of the finder is dark. This indicates that the protective cover is in the operative position and hence the camera is not ready for shooting, thereby enabling elimination of a shutter release operation which might otherwise be performed to no purpose. This provides protection to the finder objective lens 25. Since the front surface of the exposure meter light receiving section 26 is also covered, the light receiving section 26 can be protected from dust and dirt and lowering of its sensitivity can be avoided. Moreover, the arrangement in which the shield 23 turns off the switch 24 for the exposure meter power source is conducive to prevention of consumption of the power source when the camera is not in service.

Upon the protective cover 23 being moved to the inoperative position as shown in FIG. 13, the front surface of the lens tube 22 is exposed and thus it is possible to pull out the same from the retracted position to the picture-taking position. Since the shield 23b cleans the opening 21b in the main body 21 and closes the switch 24 for the power source with the movement of the protective cover 23 to the inoperative position, the camera can be brought to a shooting position in no time. It is possible to construct the lens tube 22 such that its movement is coupled to the movement of the protective cover 23 to the inoperative position, so that the lens tube 22 can be made automatically to project slightly to facilitate the operation of pulling it out or to automatically project to its picture-taking position.

Figure 14:
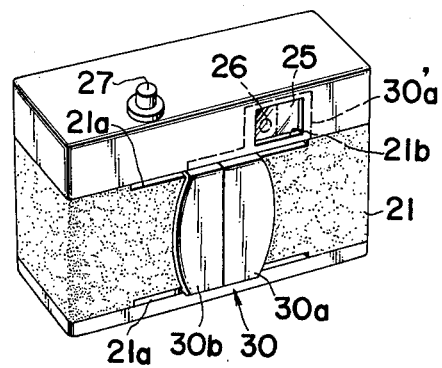
FIG. 14 and FIG. 15 are perspective views of a sixth embodiment of the invention.
Figure 15:
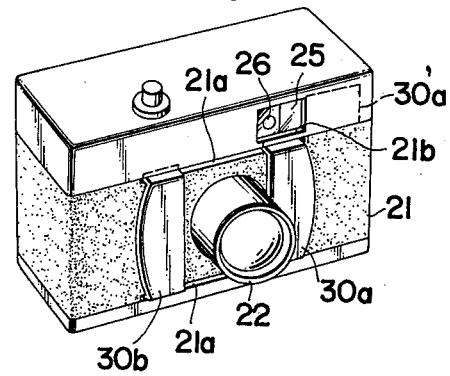
Figure 16:
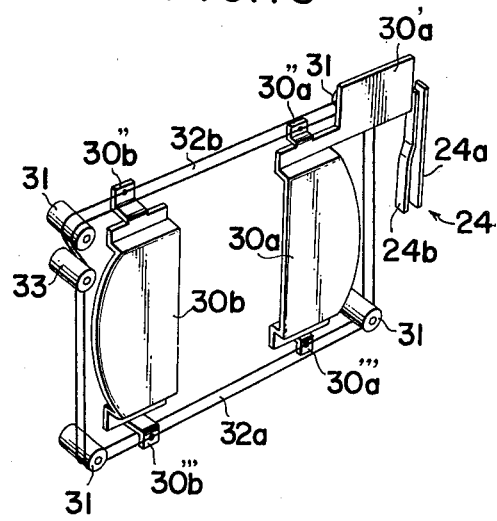
FIG. 16 is a perspective view of the protective cover made in two pieces, showing the arrangement in which the two members of the protective cover simultaneously move in opposite directions.

The protective cover 23 shown in FIG. 11 to FIG. 13 is of one-piece type and moves in one direction. FIG. 14 to FIG. 16 show a sixth embodiment in which the protective cover is made in two pieces which move in opposite directions. In FIG. 13 to FIG. 15, the body 21 of the camera, switch 24 for the exposure meter power source and finder objective lens 25 are the same as the similar parts of the fifth embodiment shown in FIG. 11 to FIG. 13. A protective cover 30 of this embodiment consists of a right cover member 30a and a left cover member 30b provided by vertically splitting the protective cover of the fifth embodiment in the center into two pieces. The right cover member 30a and left cover member 30b can move rightwardly and leftwardly, respectively, in sliding motion along the guide path defined by the two profile members 21a, 21a arranged on the front surface of the camera body 21, so that the protective cover 30 can be moved between an operative position, in which it covers the front surface of the lens tube 22 as shown in FIG. 14, and an inoperative position, in which it exposes and permits the lens tube 22 to be pulled out to a picture-taking position. The right cover member 30a of the protective cover 30 is formed with a shield 30'a which closes the opening 21b when the protective cover 30 is in the operative position and opens the same when protective cover 30 moves to the inoperative position. The shield 30a' opens the power source switch 24 when the opening 21b is closed and closes it when the opening 21b is clean. Like the protective cover 23 of the fifth embodiment, the protective cover 30 of the sixth embodiment is effective to avoid soiling of, and adhesion of dust to, the objective lens, finder objective lens and to exposure meter light receiving section and prevent damage thereto when the protective cover 30 is in the operative position, and also to prevent consumption of the power source when the camera is not in service.

In the sixth embodiment, the cover members 30a and 30b may be moved independently when the protective cover 30 is moved between the operative position and the inoperative position. Preferably, however, one of the cover members 30a and 30b is simultaneously moved the same distance as the other member is actuated to move.

FIG. 16 shows an example of such a construction of the protective cover whose cover members move simultaneously in opposite directions. The right cover member 30a is formed at its upper and lower ends with projections 30″a and 30‴a respectively, while the left cover member 30b is formed at its upper and lower ends with projection 30b″ and 30b‴ respectively. Four rollers 31 are rotatably fixed to the main body 21, and two strings 32a and 32b are trained about the four rollers 31 in such a manner that the upper runs and the lower runs of the strings 32a and 32b are parallel to one another. An adjustable tension roller 33 is provided to suitably tension the strings 32a and 32b. The projection 30a″ is attached to the upper run of the string 32a and the projection 30a‴ is attached to the lower run of the string 32b. The projection 30'b is attached to the upper run of the string 32b and the projection 30b‴ is attached to the lower run of the string 32a. By this arrangement, it is possible to simultaneously move the cover member 30a and 30b in opposite directions by moving either one of them in one direction.

The shield may be constructed so that it does not cover the entire surface of the finder objective lens but covers only a portion thereof. The shield may also be constructed so that the whole, or a portion thereof which covers the objective lens, is made of a colored transparent material.

According to the invention, the lens tube can be made to project slightly from the camera body in conjunction with the movement of the protective cover to its inoperative position, the lens tube being thereafter manually pulled out to the picture-taking position and set in such position.

From the foregoing description, it will be appreciated that the present invention enables the camera to be quickly made ready for shooting because the lens body-tube can be automatically brought to its picture-taking position merely by moving the protective cover from its operative position to its inoperative position. This permits one to take pictures by releasing the shutter at an opportune moment.

According to the invention, the release button can be automatically moved from its inoperative position to its operative position simultaneously as the lens tube is moved from its retracted position to its picture-taking position. By this arrangement, the camera can be made ready for shooting still more quickly. The camera incorporating the present invention is convenient to be carried because the objective lens tube and release button are withdrawn into the camera body when the camera is not in use. Besides, it is possible to avoid accidentally soiling or damaging the objective lens tube and release button while carrying the camera from one place to another.

What is claimed is:

1. A photographic camera of the retractable objective lens tube type comprising, in combination,
   a. an objective lens tube movable between a retracted position, in which the lens tube is disposed within the camera, and a picture-taking position, in which the lens tube projects outwardly of the camera from a front surface of the camera;
   b. means biasing said lens tube to move forwardly from its retracted position;
   c. means locking said lens tube in its retracted position against the bias of said biasing means;
   d. protective cover means movable along a guide path parallel to said front surface of the camera between an operative position, in which it covers said lens tube in its retracted position, and an inoperative position, in which it is retracted from the path of movement of said lens tube; and
   e. means operative, in conjunction with the movement of said cover means to its inoperative position, to release said locking means thereby to permit said lens tube to move forwardly from its retracted position, said cover means consisting of a pair of halves movable in respective opposite directions along said guide path.

2. A photographic camera of the retractable objective lens tube type comprising, in combination,
   a. an objective lens tube movable between a retracted position, in which the lens tube is disposed within the camera, and a picture-taking position, in which the lens tube projects outwardly of the camera from a front surface of the camera;
   b. means biasing said lens tube to move forwardly from its retracted position;
   c. means locking said lens tube in its retracted position against the bias of said biasing means;
   d. protective cover means movable along a guide path parallel to said front surface of the camera between an operative position, in which it covers said lens tube in its retracted position, and an inoperative position, in which it is retracted from the path of movement of said lens tube; and
   e. means operative, in conjunction with the movement of said cover means to its inoperative position, to release said locking means thereby to permit said lens tube to move forwardly from its retracted position;

f. power source means contained in the camera; and
g. switch means operable by said cover means to cut off said power source means when said cover means is moved into its operative position.

3. A photographic camera of the retractable objective lens tube type comprising, in combination,
   a. an objective lens tube movable between a retracted position, in which the lens tube is disposed within the camera, and a picture-taking position, in which the lens tube projects outwardly of the camera from a front surface of the camera;
   b. first means biasing said lens tube to move forwardly from its retracted position;
   c. a stop on said lens tube;
   d. a locking lever pivoted intermediate its ends on the camera;
   e. second means biasing said locking lever to a position in which an inner end thereof engages said stop in the retracted position of said lens tube to retain said lens tube in the retracted position against the bias of said first means;
   f. protective cover means movable along a guide path parallel to said front surface of the camera between an operative position, in which it covers said lens tube in its retracted position, and an inoperative position, in which it is retracted from the path of movement of said lens tube; and
   g. a coupling lever pivoted intermediate its ends on the camera and having a first end engaged with an outer end of said locking lever and a second end in the path of movement of said cover means to its inoperative position, said coupling lever, responsive to engagement of said cover means with its second end, pivoting said locking lever, against the bias of said second means, to disengage said stop for automatic movement of said lens tube to its picture-taking position under the bias of said first means.

4. A photographic camera as in claim 3 further comprising a window in the front surface of the camera additional to that of said bodytube; and a shield mounted on said cover means for movement therewith for shielding said window at least partially when said cover means is moved into its operative position.

5. A photographic camera of the retractable objective lens tube type comprising, in combination,
   a. an objective lens tube movable between a retracted position, in which the lens tube is disposed within the camera, and a picture-taking position, in which the lens tube projects outwardly of the camera from a front surface of the camera;
   b. means biasing said lens tube to move forwardly from its retracted position;
   c. means locking said lens tube in is retracted position against the bias of said biasing means;
   d. protective cover means movable along a guide path parallel to said front surface of the camera between an operative position, in which it covers said lens tube in its retracted position, and an inoperative position in which it is retracted from the path of movement of said lens tube;
   e. means operative, in conjunction with movement of said cover means to its inoperative position, to release said locking means thereby to permit said lens tube to move forwardly from its retracted position;
   f. a shutter release button movable between an operative protruding position and an inoperative position in which the button is withdrawn into the camera a predetermined amount; and
   g. means operative in conjunction with the movement of said cover means to its inoperative position to bring said button from its inoperative position into its operative protruding position.

* * * * *